United States Patent
Hong et al.

(10) Patent No.: US 12,068,089 B2
(45) Date of Patent: Aug. 20, 2024

(54) DRY-TYPE PLUG-IN BUSHING, MANUFACTURING METHOD OF THE SAME, AND HIGH-VOLTAGE INSTALLATION COMPRISING SAME

(71) Applicant: TAI HAN ELECTRIC WIRE CO., LTD., Anyang-si (KR)

(72) Inventors: Dong Suk Hong, Dangjin-si (KR); Jeong Ki Park, Seoul (KR); Jae Hyuk Song, Dangjin-si (KR); Seong Jung Kim, Gunpo-si (KR); Woo Ju Shin, Dangjin-si (KR)

(73) Assignee: TAI HAN ELECTRIC WIRE CO., LTD. (KR)

( * ) Notice: Subject to any disclaimer, the term of this patent is extended or adjusted under 35 U.S.C. 154(b) by 365 days.

(21) Appl. No.: 17/599,971

(22) PCT Filed: Mar. 3, 2020

(86) PCT No.: PCT/KR2020/002989
§ 371 (c)(1),
(2) Date: Sep. 29, 2021

(87) PCT Pub. No.: WO2020/204363
PCT Pub. Date: Oct. 8, 2020

(65) Prior Publication Data
US 2022/0172865 A1 Jun. 2, 2022

(30) Foreign Application Priority Data
Mar. 29, 2019 (KR) .................. 10-2019-0036904

(51) Int. Cl.
*H01B 17/24* (2006.01)
*B29C 39/02* (2006.01)
(Continued)

(52) U.S. Cl.
CPC ............. *H01B 17/24* (2013.01); *B29C 39/02* (2013.01); *H01B 17/26* (2013.01); *H01B 17/586* (2013.01);
(Continued)

(58) Field of Classification Search
CPC ........ H01B 17/24; H01B 17/26; H01B 17/28; H01B 17/58; H01B 17/583; H01B 17/586;
(Continued)

(56) References Cited

U.S. PATENT DOCUMENTS 3,622,688 A * 11/1971 Link .................... H02G 15/064
174/152 R
6,150,613 A * 11/2000 Bergstrom .............. H01F 27/04
174/31 R
(Continued)

FOREIGN PATENT DOCUMENTS

JP 2007028767 A 2/2007
JP 2014045553 A 3/2014
(Continued)

OTHER PUBLICATIONS

International Search Report from PCT/KR2020/002989, mail date Jun. 8, 2020, pp. 1-4, including English translation.

*Primary Examiner* — William A Bolton
(74) *Attorney, Agent, or Firm* — The Belles Group, P.C.

(57) ABSTRACT

Described is a plug-in bushing, a manufacturing method of same, and a high-voltage installation, more specifically, to a plug-in high-voltage bushing for connecting an external electrical conductor to a high-voltage installation filled with an insulating body, and to a high-voltage installation comprising the bushing. The plug-in bushing comprises: a conducting body; a resin insulating body surrounding the conducting body; an electric field-control electrode made of a (Continued)

semi-conducting synthetic resin material, coupled to an upper end of a lower support fitting; the lower support fitting connected to the outer circumference of a lower part of the resin insulating body; and injected insulating body produced by an insert injection including the outer circumference of the resin insulating body and electric field-control electrode, having formed thereon a plurality of fins; and a stress cone connected to a lower end of the resin insulating body.

7 Claims, 6 Drawing Sheets

(51) Int. Cl.
  *H01B 17/26* (2006.01)
  *H01B 17/58* (2006.01)
  *H01B 19/00* (2006.01)
  *B29L 31/34* (2006.01)

(52) U.S. Cl.
  CPC ...... *H01B 19/00* (2013.01); *B29L 2031/3412* (2013.01)

(58) Field of Classification Search
  CPC ......... H01B 19/00; B29C 39/02; B29C 45/14; B29C 45/14598; B29L 2031/3412
  USPC ................ 439/181, 578; 174/60, 650, 152 R
  See application file for complete search history.

(56) References Cited

U.S. PATENT DOCUMENTS

| | | | |
|---|---|---|---|
| 8,455,763 B2* | 6/2013 | Dais | H01F 27/04 174/152 R |
| 8,969,729 B2* | 3/2015 | Jahnel | H01B 17/26 174/650 |
| 9,947,442 B2* | 4/2018 | Engels | H02G 3/083 |
| 9,978,539 B1* | 5/2018 | Main | H01H 33/025 |
| 10,141,683 B2* | 11/2018 | Czyzewski | H02G 15/007 |
| 10,193,272 B2* | 1/2019 | Sebastián | H01R 13/6683 |
| 2012/0071014 A1 | 3/2012 | Dais et al. | |
| 2018/0115121 A1* | 4/2018 | Neumueller | H01F 38/30 |
| 2018/0286540 A1* | 10/2018 | Sumimoto | H02G 15/064 |

FOREIGN PATENT DOCUMENTS

| | | |
|---|---|---|
| JP | 2014064458 A | 4/2014 |
| KR | 20120010542 A | 2/2012 |
| KR | 1020120030984 A | 3/2012 |
| KR | 1020130023130 A | 3/2013 |
| KR | 20140086653 A | 7/2014 |

* cited by examiner

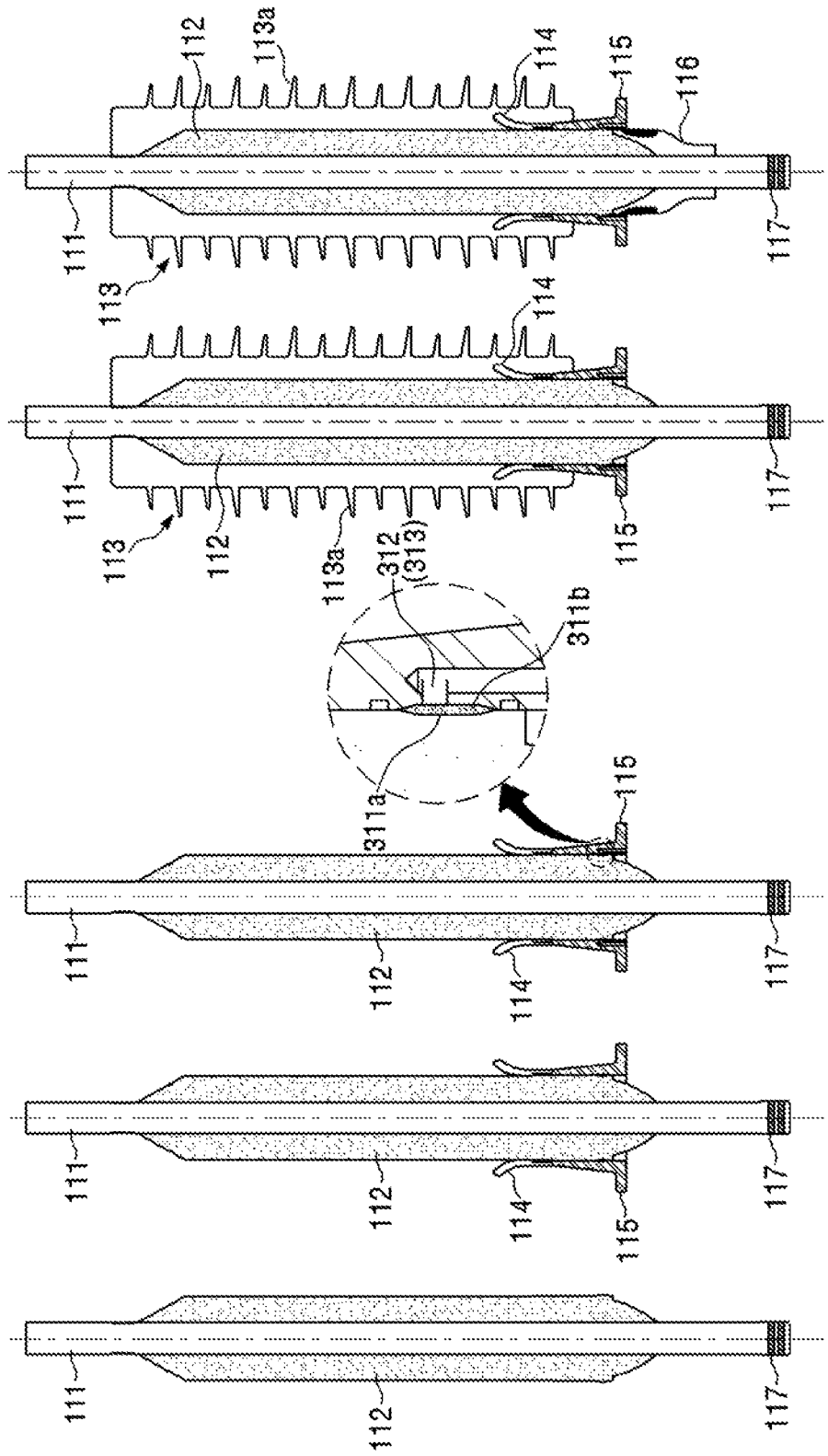

DRY-TYPE PLUG-IN BUSHING, MANUFACTURING METHOD OF THE SAME, AND HIGH-VOLTAGE INSTALLATION COMPRISING SAME

CROSS-REFERENCE TO RELATED PATENT APPLICATIONS

The present application is a U.S. national stage application under 35 U.S.C. § 371 of PCT Application No. PCT/KR2020/002989, filed Mar. 3, 2020, which claims priority to Korean Patent Application No. 10-2019-0036904, filed Mar. 29, 2019. The disclosures of the aforementioned priority applications are incorporated herein by reference in their entireties.

TECHNICAL FIELD

The present invention relates to a dry-type plug-in bushing, a manufacturing method of same, and a high-voltage installation, and more specifically, to a plug-in high-voltage bushing for connecting an external electrical conducting body to a high-voltage installation filled with an insulating body, and to a high-voltage installation including the bushing.

BACKGROUND ART

A bushing may be an insulating body having a thin cylindrical shape and used for insulation in a transformer, a circuit breaker tank, or a portion passing through a wall of a building, and the inside of the bushing may be referred to as a terminating device for connecting a coil of a transformer with an external bus bar.

The kind of the bushing includes a single-type bushing, a compound bushing, an oil filled bushing, a condenser bushing, and a gas bushing. The condenser-type bushing is generally used as an ultra-high voltage bushing applied in a high-voltage installation (a transformer).

A bushing for electric power is classified into a polymer bushing and a porcelain bushing according to a material of a porcelain tube. In recent years, the polymer bushing is spotlighted due to a weight lightening and a manufacturing method.

The condenser bushing may be classified into an oil impregnated paper (OIP), a resin impregnated paper (RIP), a resin impregnated fiberglass (RIF), and a resin impregnated synthetic (RIS) according to a core of a condenser.

Korean Patent Publication No. 10-2012-0030984 discloses a plug-in bushing and a high-voltage installation including the bushing.

In this publicized patent, a plug-in high-voltage bushing (D) for connecting an external electric conducting body to a metal-capsule-type component (T) of a high-voltage installation filled with a liquid or gas insulating material is used. The plug-in high-voltage bushing (D) is designed to be rotationally symmetric to an axis (A) direction and includes an electric conducting body (10), an electric field control device, and an insulating body (20), the insulating body (20) surrounds the electric conducting body and has a tapering section (21) for dielectrically strengthening a joint (F) after the bushing (D) is inserted to a plug portion (60) blocking the component (T) forming a sealing part for the insulating body, and the joint (F) is disposed between an insulating sleeve of the plug portion (60) and the tapering section (21).

The bushing having the above-described structure is intended to be distinguished by a relatively simple and strong design and simultaneously designed appropriately to effectively control an electric field acting during operation of the bushing even under an extremely high operation voltage. However, the electric field control device for insulation and electric field distribution in the bushing (D) and the high-voltage installation (T) has a type of a capacitor coil (40), and the capacitor coil (40) has a capacitor plate (41). Each of the capacitor coil and the capacitor plate have an excellent electric performance, but requires a process of winding the capacitor coil, a process of inserting the capacitor plate in the middle of the winding process, and a process of impregnating with an insulating material. Thus, the bushing requires expensive manufacturing costs, a long manufacturing time, and complicate processes.

RELATED ART DOCUMENT

Patent Document (Patent document 1) Korean Patent Publication No. 10-2012-0030984
(Patent document 2) Korean Patent Publication No. 10-2013-0023130

DISCLOSURE OF THE INVENTION

Technical Problem

The present invention provides a dry-type plug-in bushing that is simplified in manufacturing process by using an epoxy as a condenser for internal electric field reinforcement and arranging an electric field control electrode and a high-voltage installation including same.

The present invention also provides a dry-type plug-in bushing having a structure coupled in a plug-in type with a high-voltage installation and separately providing electric field control electrodes at upper and lower sides based on a boundary of the high-voltage installation, thereby ensuring electrical stability and a high-voltage installation including the same.

The present invention also provides a low cost and high efficient dry-type plug-in bushing by simplifying a manufacturing process such that the bushing is manufactured by a process of insert-injection an insulating body including a plurality of fins formed thereon in a state in which an electric field control electrode is coupled with a lower support fitting for supporting a cast-type resin insulating body cast in a form surrounding an outer circumference of a conducting body.

Technical Solution

According to the present invention, a dry-type plug-in bushing includes: a conducting body disposed at a center of the bushing; a cast-type resin insulating body cast in a form surrounding an outer circumference of the conducting body; an electric field control electrode made of a semi-conducting synthetic resin material, coupled to an upper end of a lower support fitting, and used as an electrode for controlling an electric field; the lower support fitting connected to an outer circumference of a lower portion of the cast-type resin insulating body; an injected insulating body produced by an insert injection including an outer circumference of the cast-type resin insulating body and the electric field control electrode, and having a plurality of fins formed thereon for ensuring a leakage distance; and a stress cone connected to a lower end of the cast-type resin insulating body and having an insulating material and a semi-conducting material combined therein.

Here, the electric field control electrode and the lower support fitting may be connected to the cast-type resin insulating body in a state in which a lower end of the electric field control electrode is coupled with an upper end of the lower support fitting, and the injected insulating body may be insert-injected in the connected state.

Here, the lower end of the electric field control electrode may include an outside coupling portion having a ' ⌐ '-shape, the upper end of the lower support fitting may include an inside coupling portion having a ' ⌐ '-shape, and the electric field control electrode and the lower support fitting may be coupled in a form of butt joint of the outside coupling portion and the inside coupling portion.

Here, the lower support fitting may include a flange and a metal pipe connected to the flange, a molding material injection part passing through the flange and the metal pipe may be formed in the lower support fitting, and a molding groove that is constant in a circumferential direction may be formed in a predetermined area of a portion in which the lower support fitting contacts the cast-type resin insulating body.

Here, before the insert injection of the injected insulating body is performed, a liquid state molding material may be injected into the molding groove through the molding material injection part and then cured, thereby using as a support material. Thus, the lower support fitting may be prevented from being pushed downward while the injected insulating body is produced.

Here, the lower support fitting may have an upper end electrically connected with the electric field control electrode and a lower end electrically connected with a semi-conducting material of the stress cone.

Also, according to the present invention, a high-voltage installation includes the dry-type plug-in bushing, which is connected in a plug-in type with a high-voltage installation metal housing for connection with the high-voltage installation.

Also, according to the present invention, a method for manufacturing a dry-type plug-in bushing includes: a cast molding process of molding a cast-type resin insulating body in a form surrounding an outer circumference of a long cylindrical conducting body and exposing both ends of the conducting body by injecting a resin into a predetermined mold in a casting method; a control electrode and support fitting connection process of coupling an electric field control electrode and a lower support fitting and then inserting the same from above the cast-type resin insulating body to be connected thereto in a state fixed at a designed position; an insert injection process of insert-injecting an injected insulating body by injecting an insulating material made of a silicon material into a predetermined mold in a state of the control electrode and support fitting connection process; and a stress cone connection process of allowing a pre-injection-molded stress cone to pass from a lower portion of the conducting body and be tightly coupled and connected to a lower portion of the cast-type resin insulating body.

Here, the method may further include, before the insert injection process, a support molding material forming process of forming a molding groove in a circumferential direction in which the lower support fitting contacts the cast-type resin insulating body and inserting a liquid state resin through a molding material injection part defined in the lower support fitting to fill and cure the inside of the molding groove.

Advantageous Effects

According to the embodiments of the present invention, the dry-type plug-in bushing that is simplified in manufacturing process by using the epoxy as the condenser for internal electric field reinforcement and arranging the electric field control electrode and the high-voltage installation including the same may be provided.

Also, the dry-type plug-in bushing having the structure coupled in the plug-in type with the high-voltage installation and separately providing the electric field control electrodes at the upper and lower sides based on the boundary of the high-voltage installation, thereby ensuring the electrical stability and the high-voltage installation including the same may be provided.

Also, the low cost and high efficient dry-type plug-in bushing may be provided by simplifying the manufacturing process such that the bushing is manufactured by the process of insert-injection the insulating body including the plurality of fins formed thereon in the state in which the electric field control electrode is coupled with the lower support fitting supporting the cast-type resin insulating body cast in the form surrounding the outer circumference of the conducting body.

BRIEF DESCRIPTION OF THE DRAWINGS

FIGS. 6A-E are views illustrating manufacturing processes of a dry-type plug-in bushing in order according to the present invention.

MODE FOR CARRYING OUT THE INVENTION

Figure 1:
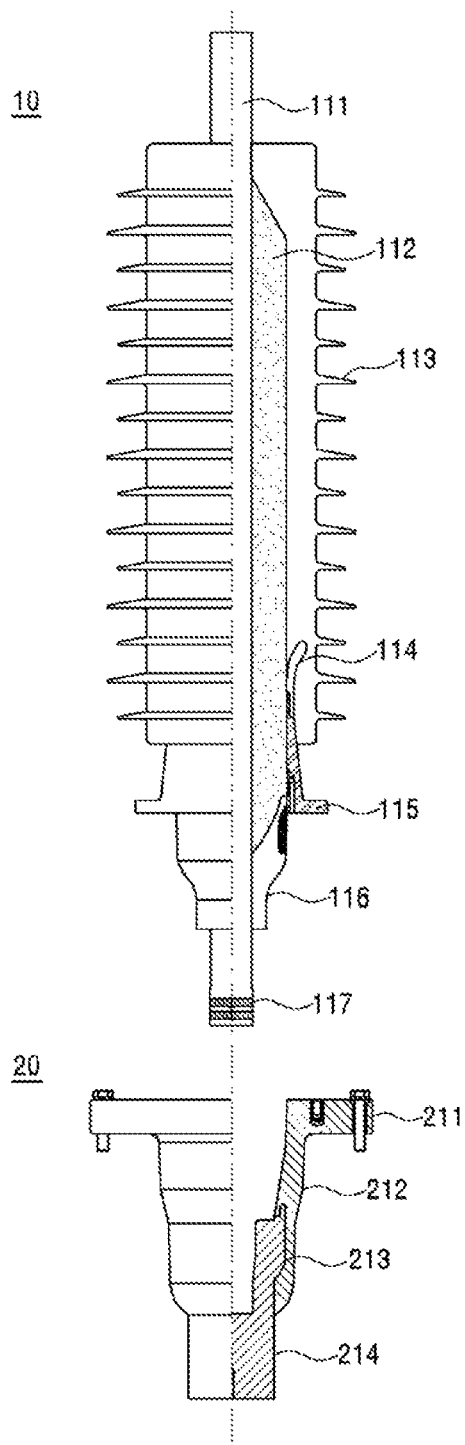
FIG. 1 is a cross-sectional view illustrating a plug-out state between a dry-type plug-in bushing and a high-voltage installation metal housing according to the present invention.

Hereinafter, a dry-type plug-in bushing, a manufacturing method of same, a high-voltage installation including the bushing, and effects thereof according to the present invention will be described with reference to the accompanying drawings.

Advantages and features of the present disclosure, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

In the following description, the technical terms are used only for explaining a specific exemplary embodiment while not limiting the present disclosure. The terms of a singular form may include plural forms unless specifically mentioned. The meaning of 'comprises' and/or 'comprising' specifies a component, a step, an operation and/or an element does not exclude other components, steps, operations and/or elements.

The object of the present invention is not limited to the aforesaid, but other objects not described herein will be clearly understood by those skilled in the art from descriptions below. Also, unless defined apparently in the description, the terms are not ideally or excessively construed as having formal meaning.

Exemplary embodiments of the inventive concept will be described below in more detail with reference to the accompanying drawings. Like reference numerals in the drawings denote like elements, and thus their description will be omitted.

Figure 2:
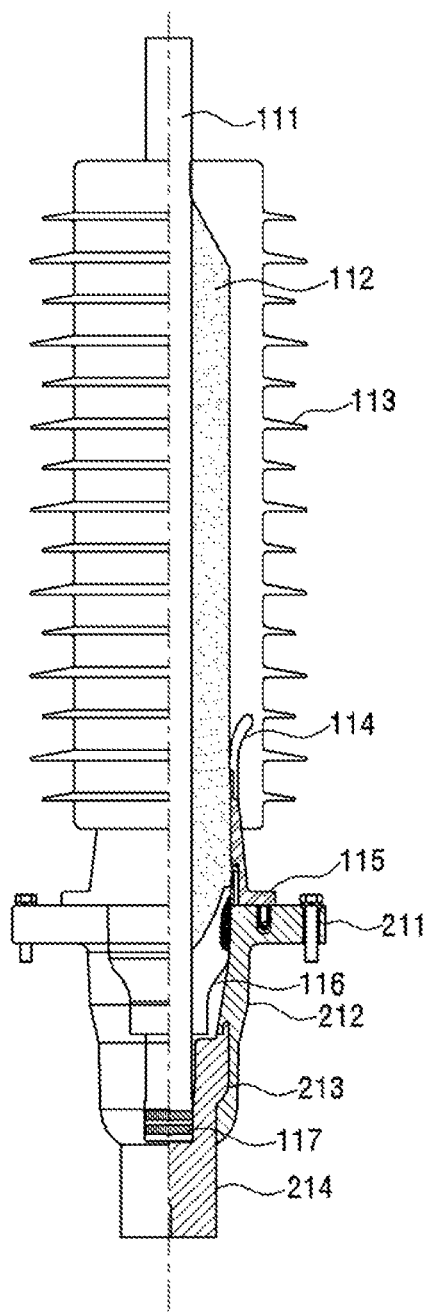
FIG. 2 is a cross-sectional view illustrating a plug-in state between the dry-type plug-in bushing and the high-voltage installation metal housing according to the present invention.

FIG. 1 is a cross-sectional view illustrating a plug-out state between a dry-type plug-in bushing and a high-voltage installation metal housing according to the present invention, and FIG. 2 is a cross-sectional view illustrating a plug-in state between the dry-type plug-in bushing and the high-voltage installation metal housing according to the present invention.

As illustrated in FIGS. 1 and 2, a dry-type plug-in bushing 10 according to the present invention may be electrically turned-on and off in a plug-in and out method with a high-voltage installation metal housing 20.

The dry-type plug-in bushing 10 may include: a conducting body 111 positioned in a center thereof; a cast-type resin insulating body 112 for insulation reinforcement of an outer circumference of the conducting body 111; an injected insulating body 113 for ensuring a leakage distance and increasing an electric field strength; an electric field control electrode 114 for mitigating an electric field concentration generated in the bushing 10; a lower support fitting 115 coupled with the electric field control electrode 114 while supporting the cast-type resin insulating body 112 and the injected insulating body 113 from therebelow and provided for coupling with the high-voltage installation metal housing 20; and a stress cone connected to a lower portion thereof for electric field mitigation.

The conducting body 111 may be connected with an electric conducting body 214 of the high-voltage installation metal housing 20 and short-circuited to receive an electric power. To this end, a contact ring 117 may be mounted to a connection end of the conducting body 111.

Both ends of the conducting body 111 may be exposed for electrical connection.

The cast-type resin insulating body 112 may be cast in a pre-manufacture mold and molded into a predetermined shape, and then assembled for insulation reinforcement according to the electric power applied to the conducting body 111.

The cast-type resin insulating body 112 may be made of an epoxy material.

The injected insulating body 113 may be injection-molded by using a pre-manufactured mold in a form surrounding the cast-type resin insulating body 112 and include a plurality of fins for ensuring a leakage distance.

The injected insulating body 113 may be made of an insulating silicon material.

The electric field control electrode 114, which is designed for mitigating electric field concentration on an end of the lower support fitting, may be made of a semi-conducting silicon material.

The injected insulating body 113 in a state of being assembled to the cast-type resin insulating body 112 may be injection-molded in a state in which the electric field control electrode 114 is electrically and mechanically connected with the lower support fitting 115.

The lower support fitting 115 may be made of a conducting metal material and a ground electrode. The lower support fitting 115 may have an upper side connected with the electric field control electrode 114, a side surface contacting and coupled with the cast-type resin insulating body 112, and a lower side coupled with a plate 211 of the high-voltage installation metal housing 20.

The stress cone 116 may be produced by injection molding and include an insulating material made of an insulating silicon material and a semi-conducting material (expressed by a hatched portion) made of a semi-conducting silicon material for mitigating an electric field strength. The stress cone 116 may be inserted upward from below the lower support fitting 115, and contact and be connected with the cast-type resin insulating body 112.

The high-voltage installation metal housing 20 is a housing electrically connected to a high-voltage installation, e.g., a transformer or a circuit breaker to serve as a socket for electrical connection with the bushing 10.

The high-voltage installation metal housing 20 may include: a plate 211 coupled with the lower support fitting 115; a plug part 212 integrated with the plate 211 and coupled with a control electrode 213; a control electrode 213 electrically contacting an outer circumference of the contact ring 117 disposed at the end of the conducting body 111 to distribute an electric field at an end thereof; and an electrical conducting body 214 integrated with the control electrode 213 and extending to be electrically connected with the high-voltage installation.

The bushing 10 according to the present invention is a terminating device connecting a coil of a transformer or a circuit breaker with an external bus bar, as an insulating body having a thin cylindrical shape and used for insulation in a transformer, a circuit breaker tank, or a portion passing through a wall of a building.

FIG. 1 illustrates a state before the bushing 10 is electrically connected with the high-voltage installation metal housing 20, FIG. 2 illustrates a state in which the bushing 10 is electrically connected and mechanically coupled to the high-voltage installation metal housing 20, and an upper portion of the conducting body 111 of the bushing 10 is connected with an external bus bar.

The above-described high-voltage thy-type system for a transformer bushing may be applied to a system requiring more transmission and distribution and has many advantages in comparison with a typical wet-type and condenser-type system.

That is, since assembly and disassembly may be extremely simple in a transformer or a system having an opening and closing device, a time for assembly is remarkably reduced because a liquid insulating material is not used, safety and reliability may be maximally guaranteed when inspected assembly-type components are used, a risk of generating particles or moisture in an installation is prevented, and a cable may be quickly and simply separated from a system component when a defect occurs through a plug-in function of the system.

Figure 3:
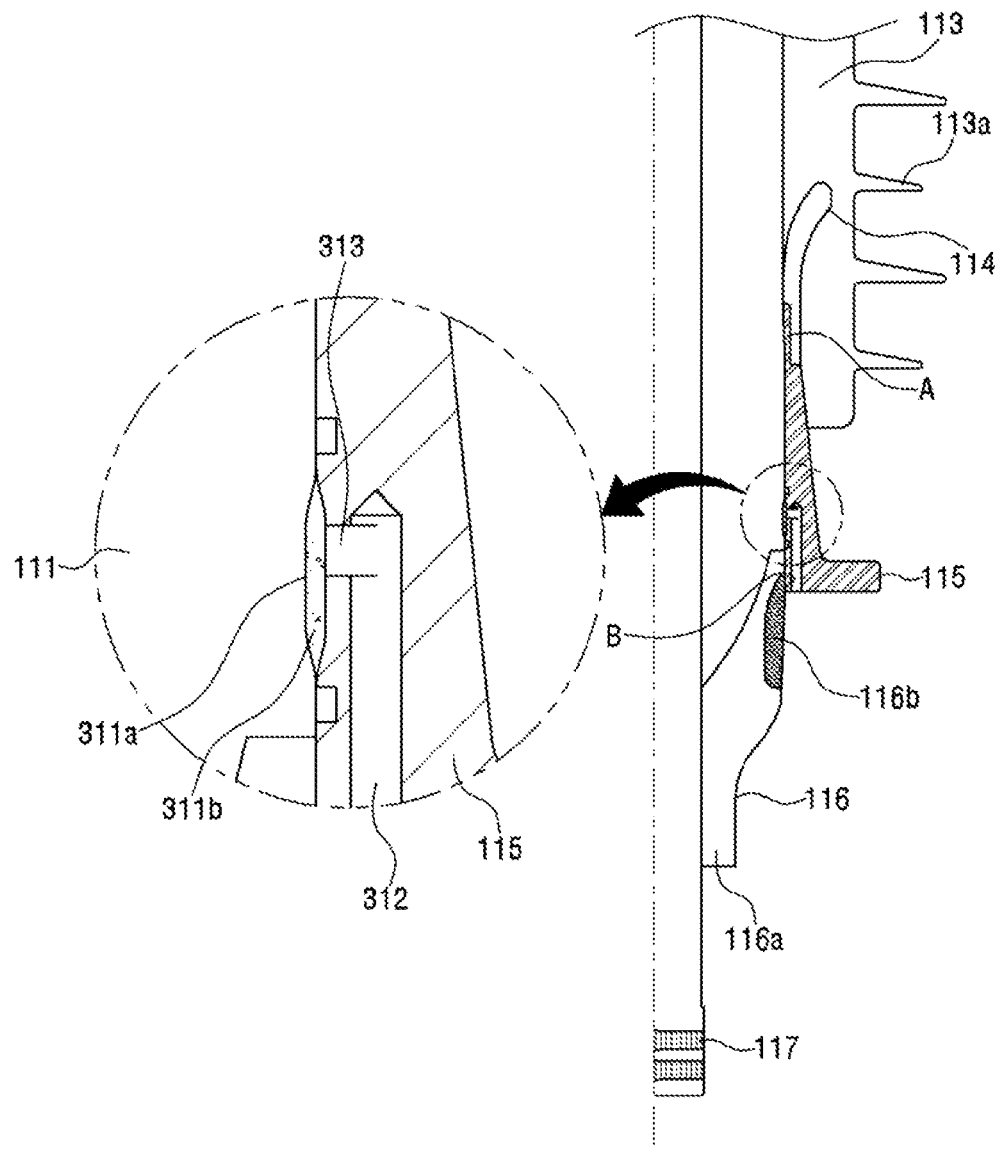
FIG. 3 is an enlarged view illustrating a lower end of FIG. 1.

FIG. 3 is an enlarged view illustrating a lower end of FIG. 1.

As illustrated in FIG. 3, in the bushing 10, the conducting body 111 is disposed at the center of the bushing 10, the cast-type resin insulating body 112 is molded and insert-connected to the outer circumference of the conducting body 111, the electric field control electrode 114 and the lower support fitting 115 are coupled and connected, the injected insulating body 113 is injection-molded, and the stress cone 116 is connected to the lower end of the cast-type resin insulating body 112.

The conducting body 111 disposed at the center is a high-voltage electrode, the lower support fitting 115 is a ground electrode, the electric field control electrode 114 has a lower end electrically connected with an upper end of the lower support fitting 115, and an outer circumference of a semi-conducting part 116b of the stress cone 116 is connected to electrically contact a lower end of the lower support fitting 115.

The injected insulating body 113 may be injection-molded based on a design in which a plurality of fins 113a formed thereon are spaced apart from each other for ensuring a leakage distance, and the stress cone 116 may be produced by simultaneously injection-molding an insulating part 116a and a semi-conducting part 116b.

Referring to an enlarged view illustrating a coupled portion of the cast-type resin insulating body 112 and the lower support fitting 115, a molding groove 311a is formed in a coupling surface between the cast-type resin insulating body 112 and the lower support fitting 115.

The molding groove 311a is formed in a circumferential direction as a recessed portion of the cast-type resin insulating body 112 and a recessed portion of the lower support fitting 115, which are manufactured based on a pre-designed state, are coupled to each other.

A molding material injection hole 313 contacting and passing through the molding groove 311a is formed by two molding material injection paths 312 at the lower end of the lower support fitting 115.

A molding material 311b is formed by filling a resin such as epoxy into the molding groove 311a through the molding material injection path 312 and the molding material injection hole 313 and curing the filled resin.

The molding material 311b may be formed in the circumferential direction and used for preventing the lower support fitting 115 from being pushed in a downward direction (the downward direction on the drawing) by an injection pressure in an injection process of the injected insulating body 113.

Since the molding material 311b is filled in a form protruding in a direction toward the lower support fitting 115 according to a shape of the molding groove, the lower support fitting 115 is caught by the molding material 311b and not pushed or escaped in the downward direction, which is for preventing a defect caused by the injection pressure in the injection process of the injected insulating body 113.

Figure 4:
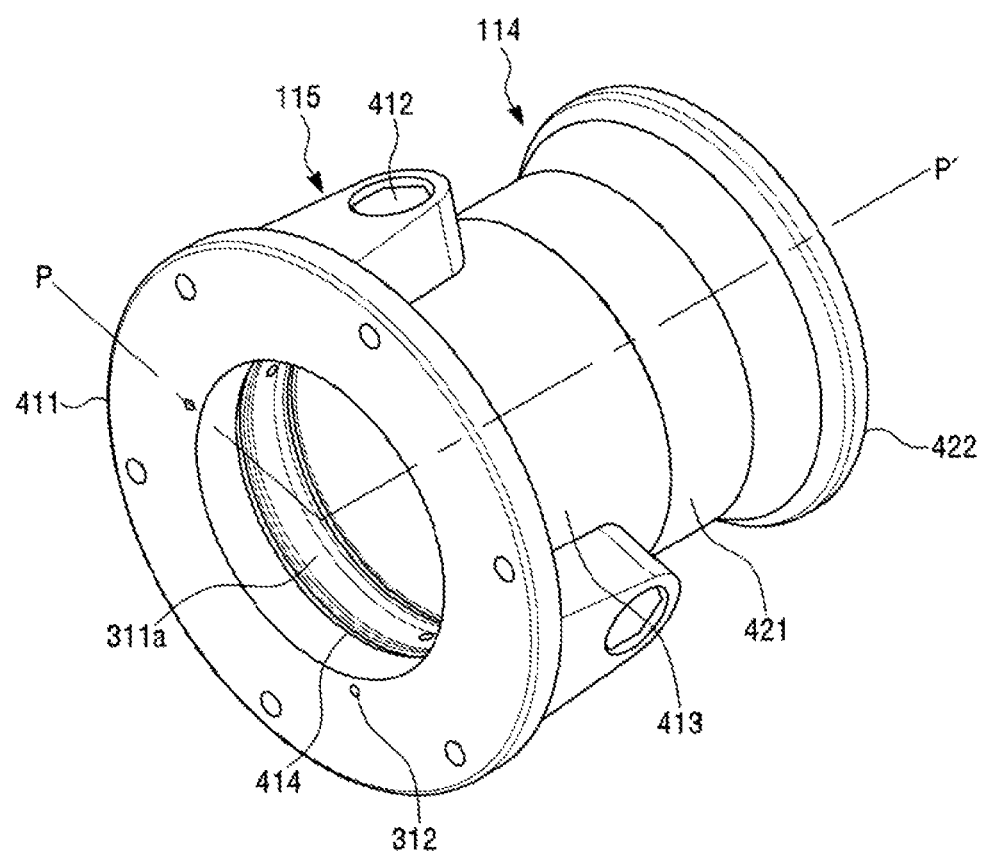
FIG. 4 is a coupling view and a structural view of a lower support fitting and an electric field control electrode of the thy-type plug-in bushing according to the present invention.
Figure 5:
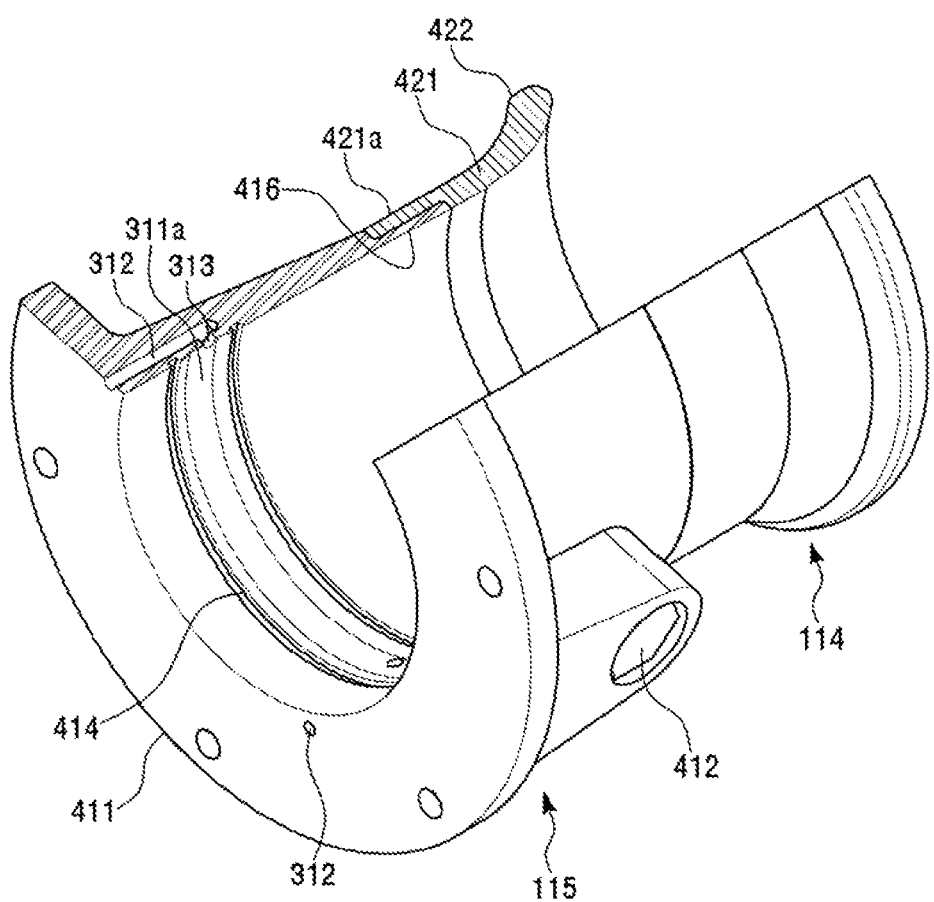
FIG. 5 is a view illustrating a cut surface along line P-P' of FIG. 4.

FIG. 4 is a coupling view and a structural view of the lower support fitting and the electric field control electrode of the dry-type plug-in bushing according to the present invention, and FIG. 5 is a view illustrating a cut surface along line P-P' of FIG. 4.

Referring to FIG. 4, the coupling view of the electric field control electrode 114 and the lower support fitting 115 is illustrated.

The electric field control electrode 114 includes a body part 421 and a control electrode part 422, and the lower support fitting 115 includes a flange 411, a metal pipe 413, and a test terminal 412.

Referring to FIGS. 4 and 5, as the electric field control electrode 114 has an outside coupling portion 421a having a '⌐'-shape at an end thereof, and the lower support fitting 115 has an inside coupling portion 416 having a '⌞'-shape, the outside coupling portion 421a and the inside coupling portion 416 may be coupled to each other in the form of butt joint.

The molding groove 311a may be formed in an inner circumference of the metal pipe 413, the molding groove 311a may be connected to the molding material injection hole 313, the molding material injection hole 313 may be connected to the molding material injection path 312, and the molding material injection path 312 may contact the molding material injection hole 313 through the flange 411 and the inside of the metal pipe 413.

An O-ring groove 414 is formed at both sides of the molding groove 311a while being spaced apart from molding groove 311a, and an O-ring is coupled to the O-ring groove 414.

The O-ring is used to fundamentally prevent the resin such as epoxy from being leaked to the outside of the molding groove 311a.

The test terminal 412 may be a preliminary terminal for an electrical test such as capacitance and dielectric tangent after the bushing 10 and the high-voltage installation metal housing 20 are coupled.

FIGS. 6A-E are views illustrating manufacturing processes of a dry-type plug-in bushing in order according to the present invention.

FIGS. 6A-E are schematic views illustrating the manufacturing processes of the dry-type plug-in bushing in an order from A to E. The bushing, as a dry-type and stress cone electric field mitigation-type, may be easily manufactured and, as a plug-in type, may be easily connected and easily replaced and repaired in comparison with a typical wet-type and condenser-type bushing.

Also, the bushing may have economic feasibility and effectiveness due to the manufacturing easiness in comparison with an oil impregnated paper (OIP), a resin impregnated paper (RIP), a resin impregnated fiberglass (RIF), and a resin impregnated synthetic (RIS), each of which has a frequently used typical condenser bushing type.

Firstly, a conducting body 111 is processed, and a contact ring 117 is coupled to an end of the conducting body 111. As illustrated in FIG. 6A, the cast-type resin insulating body 112 is molded in a form surrounding an outer circumference of the conducting body 111 by injecting a resin into a predetermined mold in a casting method, and then a finishing treatment is performed thereon.

Thereafter, as illustrated in FIG. 6B, an electric field control electrode 114 and a lower support fitting 115 are coupled to each other through an outside coupling portion 412a and an inside coupling portion 416, and then inserted from below the cast-type resin insulating body 112 to be fixed at a designed position.

Silicon grease may be applied to a mutually contacting surface of the electric field control electrode 114 and the lower support fitting 115, and a molding groove 311a may be formed in an outer circumference at which the cast-type resin insulating body 112 contacts the lower support fitting 115.

After the process in FIG. 6B is completed, a liquid state resin (an epoxy material) is injected through a molding material injection path 312 and a molding material injection hole 313 which are defined in the lower support fitting 115, to fill the inside of the molding groove 311a connected to the molding material injection hole 313 and then cured in a process in FIG. 6C.

Since the molding material 311b fixes the lower support fitting 115 at a regular position, the lower support fitting may be prevented from being pushed or escaped in a downward direction.

In this state, an injected insulating body 113 is formed by inserting a shape in FIG. 6C into a predetermined designed mold and injecting an insulating material made of a silicon material in a process in FIG. 6D.

The injected insulating body 113 may include a plurality of fins 113a formed thereon to ensure a leakage distance, and be injected in a form completely surrounding the electric field control electrode 114 while exposing the lower support fitting 115 except for a portion of an upper side thereof.

Finally, a pre-injected stress cone 116 passes from a lower portion of the conducting body 111 and is completely coupled to a lower portion of the cast-type resin insulating body 112 in a process in FIG. 6E.

Interfaces at which the stress cone 116 contacts the cast-type resin insulating body 112 are pre-designed and manufactured to have the same inclined surface.

The above-described configuration of the present invention may simplify the manufacturing process by using the epoxy for a condenser for internal electric field reinforcement and arranging the electric field control electrode, may have a structure coupled in the plug-in type with the high-voltage installation to separately provide the electric field control electrodes at upper and lower sides based on a boundary of the high-voltage installation, thereby ensuring electrical stability and easily performing assembly, maintenance, and replacement, and may mold and assemble the cast-type resin insulating body and the injected insulation body, which are matched with the thy-type bushing, to ensure easiness of manufacturing.

Also, a defect rate may be minimized by adding the molding material curing process through the molding groove and the injection hole for preventing the lower support fitting from being pushed during the injection molding of the final injected insulating body, and the electrical connection limitation of the electric field control electrode may be simply resolved as the silicon injection molding is performed after the electric field control electrode and the lower support fitting are firstly coupled.

The description of the present invention is intended to be illustrative, and those with ordinary skill in the technical field of the present invention will be understood that the present invention can be carried out in other specific forms without changing the technical idea or essential features. Therefore, the embodiments described above include exemplary in all respects and not restrictive, but it should be understood.

DESCRIPTION OF REFERENCE NUMERALS

10: Bushing
20: High-voltage installation metal housing
111: Conducting body
112: Cast-type resin insulating body
113: Injected insulating body
113a: Fin
114: Electric field control electrode
115: Lower support fitting
  116: Stress cone
  117: Contact ring
  211: Plate
  212: Plug part
  213: Control electrode
  214: Electric conducting body
  311a: Molding groove
  311b: Molding material
  312: Molding material injection path
  313: Molding material injection hole
  411: Flange
  412: Test terminal
  413: Metal pipe
  414: O-ring groove
  416: Inside coupling portion
  421: Body part
  421a: Outside coupling portion
  422: Control electrode part

What is claimed is:

1. A plug-in bushing comprising:
a conducting body disposed at a center of the bushing;
a resin insulating body cast in a form surrounding an outer circumference of the conducting body;
an electric field control electrode made of a semi-conducting synthetic resin material, coupled to an upper end of a lower support fitting, and used as an electrode for controlling an electric field;
the lower support fitting connected to an outer circumference of a lower portion of the resin insulating body;
an injected insulating body produced by an insert injection comprising an outer circumference of the resin insulating body and the electric field control electrode, and having a plurality of fins formed thereon for ensuring a leakage distance;
a stress cone connected to a lower end of the resin insulating body and having an insulating material and a semi-conducting material combined therein, wherein the lower support fitting comprises a flange and a metal pipe connected to the flange, and a molding material injection part passing through the flange and the metal pipe is formed in the lower support fitting; and
a molding groove that is constant in a circumferential direction is formed in a predetermined area of a portion in which the lower support fitting contacts the resin insulating body.

2. The plug-in bushing of claim 1, wherein the electric field control electrode and the lower support fitting are connected to the resin insulating body in a state in which a lower end of the electric field control electrode is coupled with the upper end of the lower support fitting, and
the injected insulating body is insert-injected in a connected state.

3. The plug-in bushing of claim 2, wherein the lower end of the electric field control electrode comprises an outside coupling portion having a shape having a form of an inverted and backward letter "L", and the upper end of the lower support fitting comprises an inside coupling portion having a shape having a form of a letter "L", and
the electric field control electrode and the lower support fitting are coupled in a form of butt joint of the outside coupling portion and the inside coupling portion.

4. The plug-in bushing of claim 1, wherein before the insert injection of the injected insulating body is performed, a liquid state molding material is injected into the molding groove through the molding material injection part and then cured.

5. The plug-in bushing of claim 1, wherein the lower support fitting has an upper end electrically connected with the electric field control electrode and a lower end electrically connected with the semi-conducting material of the stress cone.

6. A high-voltage installation comprising the plug-in bushing of claim 1, which is connected with a high-voltage installation metal housing for connection with the high-voltage installation.

7. A method for manufacturing a plug-in bushing, comprising:
a cast molding process of molding a resin insulating body in a form surrounding an outer circumference of a long cylindrical conducting body and exposing both ends of the conducting body by injecting a resin into a predetermined mold in a casting method;

a control electrode and support fitting connection process of coupling an electric field control electrode and a lower support fitting and then inserting the electric field control electrode and a lower support fitting from above the resin insulating body to be connected thereto in a state fixed at a designed position;

a support molding material forming process of forming a molding groove in a circumferential direction in which the lower support fitting contacts the resin insulating body and inserting a liquid state resin through a molding material injection part defined in the lower support fitting to fill and cure the inside of the molding groove;

after the support molding material forming process, an insert injection process of insert-injecting an injected insulating body by injecting an insulating material made of a silicon material into a predetermined mold in a state of the control electrode and support fitting connection process; and a stress cone connection process of allowing a pre-injection-molded stress cone to pass from a lower portion of the conducting body and be tightly coupled and connected to a lower portion of the resin insulating body.

* * * * *